Patented May 27, 1952

2,598,018

UNITED STATES PATENT OFFICE 2,598,018

SPONGE RUBBER AND METHOD OF MAKING SAME

Thomas H. Rogers, Jr., Akron, Ohio, assignor to Wingfoot Corporation, Akron, Ohio, a corporation of Delaware No Drawing. Application May 12, 1950, Serial No. 161,730

12 Claims. (Cl. 260—723)

This invention relates to frothed rubber latex sponge and particularly sponge containing an agent capable of inhibiting surface collapse and other defects during the gelation of the frothed rubber latex used in the production of the sponge.

The preparation of sponge-like compositions from both natural and synthetic rubber latex is well known. Concentrated latices are mixed with latex stabilizing agents, curing agents, gelling agents and other modifying chemicals and then frothed either by beating air into the latex or by introducing gas into the latex by chemical means, as for example, through the decomposition of hydrogen peroxide. The gelling agent contained in the latex converts the resulting foam latex into a weak, but self-sustaining material, commonly known as gelled latex. The gelled latex is then cured or vulcanized into a tough, elastic sponge-like composition.

Many methods are used to gel the frothed latex, including the use of salts of hydrofluosilicic acid. It is common procedure when using these salts of hydrofluosilicic acid to reduce the ammonia content of the latex to 0.25% and then add soaps and/or other surface-active agents as a means of stabilizing the froth. The vulcanization agents are then added to the partially deammoniated, soap stabilized latex, and these agents include sulphur, an accelerator, an antioxidant, and zinc oxide. Zinc oxide is usually added to the latex after it has been frothed; otherwise an earlier addition of the zinc oxide depresses the frothing rate resulting in an unstable frothed latex.

In addition, ingredients may be added to improve the "snap" of the sponge, such as mineral oils, petrolatum and petroleum oils. However, the addition of these oils tends to decrease the load-carrying capacity of the sponge. However, when solid paraffin is used in place of these oils, the "snap" of the sponge is improved without decreasing its load-carrying capacity.

More specifically, latex containing about 60% solids is compounded as indicated above and then weighed into a frothing bowl. A wire whip which revolves in a planetary motion and which may be adjusted to varying speeds, beats air into the latex, causing the latex to rise in the bowl in proportion to the quantity of air that is introduced. In continuous frothing units, the air may be introduced into the latex by means of small jets submerged in the latex.

After the latex is frothed to the desired height in the bowl and to the desired density, the finishing ingredients are added, consisting of zinc oxide, a gellant, and other compounding ingredients, as needed. If diphenylguanidine is used as an accelerator, it may be added at this stage. The use of diphenylguanidine is well known, as disclosed in U. S. 1,816,764; 1,959,160; 1,991,860; 1,807,355; 1,841,322; and 1,800,405.

It is known that the substituted guanidines, such as diphenylguanidine, also act in some capacity as gellants. If the salts of hydrofluosilicic acid are employed as the gellant, the addition of, for example. diphenylguanidine, will increase the rate at which the latex will gel. Thus, the use of diphenylguanidine may be classed as a gellant performing a secondary function over and above the function performed by the salts of hydrofluosilicic acid.

As will be appreciated by those skilled in the art, the frothing of latex, and the subsequent gelation of the frothed latex in the production of a good quality sponge, involves considerable skill and close control of all compounding ingredients, particularly with regard to their time of addition, amount, and order. It has been observed that under improper conditions of frothing, and before gelation takes place, there is a tendency for the froth to either partially or completely collapse. One of the reasons for this collapse is that the froth stabilizing action of the soap or soaps contained in the latex is decreased before gelation and coalescence of the latex particles takes place. This decrease in the stabilizing action of soap may either be due to the decomposition of the soap by the decrease in pH which takes place after the addition of the hydrofluosilicic acid salts, or the collapse may be due to a colloidal precipitate which is believed to be formed in situ in the system and adversely affects the froth stabilizing action of the soap. In natural rubber latices, this "surface collapse" during gelation is a serious problem and difficult to solve. Latices from the same source as, for example, the same plantation, will vary greatly in this "surface collapse" characteristic.

Various methods have been used in correcting this condition. For example, it has been noted that improvement in surface collapse is obtained by increasing the time of maturation or by the prevulcanization of the latex. The tendency for the latex to show surface collapse after it has been frothed may also be reduced by increasing the temperature at which the frothed latex is gelled. Another method involves the use of accelerators such as diphenylguanidine which also functions as a gellant, particularly as a heat gellant. When these gellants are used, the tendency for the frothed latex to collapse at the surface is diminished. However, these methods are only temporary expedients for decreasing the tendency of "surface collapse" and, more important, they introduce many additional problems that discourage rather than encourage the use of these methods.

For example, when a longer maturation time is used, exhaustive tests and controls on each batch of latex must be run in order to make each batch of latex process in substantially the same manner. Also, in maturing the latex beyond a certain stage, it is very often observed that the physical properties of the finished sponge, such as its tensile and elongation, are decreased.

When an alkaline metal salt of hydrofluosilicic acid is used, such as sodium silicofluoride, the amounts of the salt must be varied in accordance with the temperature at which the salt is employed. In the summer when the temperature is relatively high, gelation proceeds at a much faster rate than in the winter when the temperature is lower.

When the gelation time is increased by increasing the temperature at which gelation is brought about, there is a tendency to form "blows" throughout the sponge.

If diphenylguanidine is used to inhibit surface collapse, the amount of diphenylguanidine used has to be varied with each batch of latex used, and when so varied, changes in vulcanization occur which require adjustment in order to produce a sponge of marketable value. For example, the sponge may be undercured in one case and overcured in another case, and when so cured the resulting sponge possesses very poor physical properties, especially poor ageing properties. When white and pastel shades of sponge are made and diphenylguanidine is used as the gellant, there is a noticeable staining, as, for example, the appearance of streaks of an off-yellow color in the finished sponge.

All of these difficulties may now be eliminated in accordance with the present invention by employing the use of salts of guanidine as a means of inhibiting the tendency of the frothed latex sponge to collapse at the surface and without the introduction of other problems.

The scope of this invention includes the use of all salts of guanidine made from the use of mineral acids such as nitric acid, sulfuric acid and hydrochloric acid. The organic acids may also be used in making these salts of guanidine. A particularly desirable class of organic acids that may be used are the aliphatic acids, particularly those having from 1 to 20 carbon atoms and especially the saturated aliphatic acids having from 1 to 20 carbon atoms. More specifically, the saturated aliphatic acids having from 1 to 6 carbon atoms may be used, and desirably the monocarboxylic acids in this group of saturated aliphatics having 1 to 6 carbon atoms. The guanidine salts of aromatic acids and of alicyclic acids may be used. Specific examples include carbonic acid, acetic acid, stearic acid, capric acid, valeric acid, acrylic acid, sebacic acid, adipic acid, succinic acid, benzoic acid, phthalic acid, cyclopentanecarboxylic acid, cyclohexanecarboxylic acid, and the terpene acids such as camphoric acid.

Guanidine, $HN:C(NH_2)_2$, is a colorless, very hygroscopic, crystalline solid which is exceedingly soluble in water. It is a strong base, as is evidenced by the fact that it absorbs carbon dioxide from the air and forms crystalline salts with one equivalent of acid. In these the acid hydrogen becomes attached to the imino-nitrogen thus:

$([NH_2]_2C:NH)HCl$ is known as guanidine hydrochloride;

$([NH_2]_2C:NH)_2H_2CO_3$ is known as guanidine carbonate;

$([NH_2]_2C:NH)HNO_3$ is known as guanidine nitrate;

$([NH_2]_2C:NH)CH_3COOH$ is known as guanidine acetate; and $([NH_2]_2C:NH)_2H_2SO_4$ is known as guanidine sulfate.

The salts of guanidine may be added to the latex either as solutions or as dispersions. As little as 0.075% by weight, based on the weight of rubber treated, has been to greatly inhibit the tendency of the surface of the frothed latex sponge to collapse. As much as 1% of the guanidine salt may be used, and advantageous results are observed when amounts as high as 5% are used. Since only mere traces of the guanidine salt are necessary to bring about the desired result, amounts greater than this would be uneconomical to use.

The salts of guanidine may be added to the latex either before, during or after frothing. Zinc oxide, which is usually added as a dispersion, as late in the process as possible, may have admixed with it the desired salt of guanidine, or the desired salt of guanidine may be added to any of the other finishing ingredients that are added to the latex.

The following examples illustrate specific embodiments of the invention, and the term "parts" signifies parts by weight.

EXAMPLE 1

*Preparation of the latex*

Creamed natural rubber latex containing 60% solids was used and its ammonia content was reduced from 0.60% to 0.20%. Compounding ingredients were added to the latex during this agitation in the following dry proportions:

| | Parts |
|---|---|
| Latex as dry rubber | 100.000 |
| Ethylzimate | 1.000 |
| Sulfur | 0.5000 |
| Paraffin wax | 1.000 |

After these ingredients had been added to the latex, the resulting compounding latex was let stand for 16 hours at 78° F. The latex was then cooled to 65° F. and the following ingredients added to the latex during stirring:

| | Parts |
|---|---|
| Sulfur | 1.750 |
| Zinc Captax (zinc salt of mercaptobenzothiazole) | 1.500 |
| Agerite white (sym. dibeta naphthyl p-phenylenediamine) | 1.000 |
| Potassium castor oil soap | 0.830 |
| Potassium oleate soap | 0.518 |

The total solids of the compounded latex was reduced to 58% by the addition of water.

EXAMPLE 2

A quantity of latex made in accordance with Example 1 equivalent to 200 parts of dry rubber was placed in a 5-quart capacity frothing bowl and frothed with air, using a wire frothing beater so that the volume of the mixture was increased 12 times its original volume. Ten grams of zinc oxide in the form of a water dispersion was added to the frothed latex and mixed into the latex for one minute. Four grams of sodium silicofluoride in the form of a water dispersion was then added to the latex by stirring for one minute. The compounded frothed latex was then poured into an aluminum metal pan 3.18 cm. deep and having a displacement of 2040 cc. The top of the pan was scraped evenly across the surface and the excess frothed latex discarded. After 4 minutes the surface of the frothed latex began to collapse. It was also observed that throughout the entire volume of the frothed latex, eruptions or blows appeared. After 5 minutes, gelation was completed, and the latex became a tough, gelled structure. The gelled latex was vulcanized in wet steam at 250° F. for 12 minutes and dried for 16 hours in an air oven at 160° F. The resultant sponge had a very coarse structure with a loose surface skin and a slab thickness of 1.7 cm.

EXAMPLE 3

A quantity of latex made in accordance with Example 1 equivalent to 200 parts of dry rubber was placed in the frothing bowl. A 10% aqueous solution of guanidine nitrate, equivalent to 0.2 part of guanidine nitrate, was added with slight stirring to the latex mix and the mix was then frothed in the manner described in Example 2. Zinc oxide and sodium silicofluoride were then added in the same quantity and under the same conditions as disclosed in Example 2. After the frothed latex had been poured into the aluminum metal pan, and the surface scraped evenly, gelation of the frothed latex took place within a period of 5 minutes. No surface collapse was apparent and no eruptions or blows appeared throughout the volume of the sponge. The gelled sponge was cured and dried in accordance with the conditions described in Example 2. The resultant sponge had a very uniform structure with a good tight skin and a slab thickness of 2.65 cm.

EXAMPLE 4

A sample of the frothed latex sponge was made in accordance with the procedure set forth in Example 3, with the exception that the guanidine nitrate was added to the dispersion of zinc oxide, i. e., a 10% water solution containing .2 part of guanidine nitrate was added to a zinc oxide dispersion containing 10 parts of zinc oxide, which dispersion was then added to the frothed latex and allowed to be stirred into the latex for one minute, after which the sodium silicofluoride dispersion (4 parts dry) was added. The resulting frothed latex gelled in 5 minutes and no surface collapse could be observed, nor did eruptions or blows appear throughout the volume of the sponge. After curing and drying, the resultant sponge had a very uniform structure, and a slab thickness of 2.6 cm.

EXAMPLE 5

A sample of sponge rubber was made in accordance with the manner described in Example 4 with the exception that .50 part of guanidine nitrate as a 25% dispersion of the salt in water was added to a zinc oxide dispersion containing 10 grams of zinc oxide. Gelation occurred after 5 minutes and there was no surface collapse, no eruptions, and no blows, to be found throughout the mass. After curing and drying, a sponge was produced having a uniform core structure, an even tight skin, and a slab thickness of 2.7 cm.

EXAMPLE 6

The same conditions used in Example 5 were used here, with the exception that guanidine carbonate was used in place of guanidine nitrate. No surface collapse was observed, and eruptions and blows were not found. A sponge with good structure, uniform skin, and a slab thickness of 2.6 cm. was produced.

EXAMPLE 7

A sponge was made in accordance with the procedure described in Example 6, with the exception that 1/3 of the quantity of the natural rubber latex was replaced with an equal quantity of a synthetic rubber latex produced by the aqueous emulsion polymerization of a mixture containing 70 parts of butadiene-1,3 and 30 parts of styrene. No surface collapse was observed during gelation, nor were any blows or eruptions found. The resulting sponge had a very good pore structure and a tight skin.

EXAMPLE 8

A sample of sponge was made in accordance with the conditions set forth in Example 7, with the exception that 2.00 parts of guanidine nitrate was added as a 25% dispersion of the salt and water, together with the zinc oxide. The gelation time was decreased from 5 minutes to 2½ minutes. No surface collapse was observed during gelation, nor were eruptions or blows found. The sponge was of uniform pore structure and possessed a good skin.

EXAMPLE 9

A sample of sponge was made in accordance with the conditions set forth in Example 4, with the exception that 1.00 parts of guanidine sulfate was added as a 50% dispersion of the salt and water, together with the zinc oxide. The time of gelation was 5 minutes. No surface collapse was observed during gelation, nor were eruptions or blows formed. The sponge was of uniform pore structure and possessed a good skin.

EXAMPLE 10

A sample of sponge was made in accordance with the conditions set forth in Example 4, with the exception that 1 part of guanidine acetate was added as a 50% dispersion of the salt and water, together with the zinc oxide. The time of gelation was 5 minutes. No surface collapse was observed during gelation, nor were eruptions or blows formed. The sponge was of uniform pore structure and possessed a good skin.

In none of the samples of sponge produced in accordance with the foregoing examples were any traces of staining or discoloration found. In all of the samples of sponge produced, no undesirable physical properties with regard to tensile strength, load-carrying capacity, or "snap," were found.

While certain representative embodiments and details have been shown for the purpose of illustrating the invention, it will be apparent to those skilled in this art that various changes and modifications may be made therein without departing from the spirit or scope of the invention.

I claim:

1. The method of making a frothed rubber latex sponge which comprises gelling a frothed rubber latex in the presence of an alkali metal salt of hydrofluosilicic acid as a gellant in amount sufficient to gel the frothed latex and of a small amount of a water-soluble salt resulting from the reaction of guanidine and an acid selected from the group consisting of mineral and carboxylic acids whereby collapse of the surface cells of the frothed latex is inhibited during gelation, vulcanizing the gelled latex and recovering the frothed rubber latex sponge.

2. The method of making a frothed rubber latex sponge which comprises gelling a frothed rubber latex in the presence of an alkali metal salt of hydrofluosilicic acid as a gellant in amount sufficient to gel the frothed latex and of from 0.075% to 5%, based on the weight of the rubber latex present, of a water-soluble salt resulting from the reaction of guanidine and an acid selected from the group consisting of mineral and carboxylic acids whereby collapse of the surface cells of the frothed latex is inhibited during gelation, vulcanizing the gelled latex and recovering the frothed rubber latex sponge.

3. The method of making a frothed rubber latex sponge which comprises gelling a frothed rubber latex selected from at least one of the group consisting of natural rubber latex and a synthetic diene rubber latex in the presence of an alkali metal salt of hydrofluosilicic acid as a gellant in amount sufficient to gel the frothed latex and of from 0.075% to 5%, based on the weight of the rubber latex present, of a water-soluble salt resulting from the reaction of guanidine and an acid selected from the group consisting of mineral and carboxylic acids whereby collapse of the surface cells of the frothed latex is inhibited during gelation, vulcanizing the gelled latex and recovering the frothed rubber latex sponge.

4. The method of making a frothed rubber latex sponge which comprises gelling a frothed rubber latex selected from at least one of the group consisting of natural rubber latex and a synthetic diene rubber latex in the presence of a salt of hydrofluosilicic acid in amount sufficient to gel the frothed latex and of from 0.075% to 5%, based on the weight of the rubber latex present, of a water-soluble salt resulting from the reaction of guanidine and an acid selected from the group consisting of mineral and carboxylic acids whereby collapse of the surface cells of the frothed latex is inhibited during gelation, vulcanizing the gelled latex and recovering the frothed rubber latex sponge.

5. In the method of making a frothed rubber latex sponge by frothing a rubber latex, gelling the frothed latex in the presence of an alkali metal salt of hydrofluosilicic acid as a gellant, and vulcanizing the gelled latex, the novel step of adding a water-soluble salt resulting from the reaction of guanidine and an acid selected from the group consisting of mineral and carboxylic acids to the ungelled latex in a small amount whereby collapse of the surface cells of the frothed latex is inhibited during gelation.

6. A frothed rubber latex containing an alkali metal salt of hydrofluosilicic acid as a gellant and a water-soluble salt resulting from the reaction of guanidine and an acid selected from the group consisting of mineral and carboxylic acids in amount sufficient to inhibit collapse of the surface cells of the frothed latex during gelation of the latex.

7. A frothed rubber latex selected from at least one of the group consisting of natural rubber latex and a synthetic diene rubber latex containing an alkali metal salt of hydrofluosilicic acid as a gellant and from 0.075% to 5%, based on the weight of the rubber latex present, of a water-soluble salt resulting from the reaction of guanidine and an acid selected from the group consisting of mineral and carboxylic acids.

8. A frothed rubber latex containing an alkali metal salt of hydrofluosilicic acid as a gellant in amount sufficient to gel the frothed latex and guanidine sulfate in amount sufficient to inhibit collapse of the surface cells of the frothed latex during gelation of the latex.

9. A frothed rubber latex containing an alkali metal salt of hydrofluosilicic acid as a gellant in amount sufficient to gel the frothed latex and guanidine nitrate in amount sufficient to inhibit collapse of the surface cells of the frothed latex during gelation of the latex.

10. A frothed rubber latex containing an alkali metal salt of hydrofluosilicic acid as a gellant in amount sufficient to gel the frothed latex and guanidine hydrochloride in amount sufficient to inhibit collapse of the surface cells of the frothed latex during gelation of the latex.

11. A frothed rubber latex containing an alkali metal salt of hydrofluosilicic acid as a gellant in amount sufficient to gel the frothed latex and guanidine carbonate in amount sufficient to inhibit collapse of the surface cells of the frothed latex during gelation of the latex.

12. A frothed rubber latex containing an alkali metal salt of hydrofluosilicic acid as a gellant in amount sufficient to gel the frothed latex and guanidine acetate in amount sufficient to inhibit collapse of the surface cells of the frothed latex during gelation of the latex.

THOMAS H. ROGERS, JR.

REFERENCES CITED

The following references are of record in the file of this patent:

UNITED STATES PATENTS

| Number | Name | Date |
| --- | --- | --- |
| 1,839,950 | Cadwell et al. | Jan. 5, 1932 |
| 1,991,860 | Madge | Feb. 19, 1935 |
| 2,100,085 | Newman | Nov. 23, 1937 |
| 2,140,062 | Talalay | Dec. 13, 1938 |
| 2,290,567 | MacKay | July 21, 1942 |
| 2,360,913 | Van Valkenburgh | Oct. 24, 1944 |
| 2,512,475 | Bau | June 20, 1950 |